Aug. 10, 1943.  G. H. HUFFERD  2,326,143
SELF SEALING DETACHABLE COUPLING
Filed March 31, 1941   2 Sheets-Sheet 1
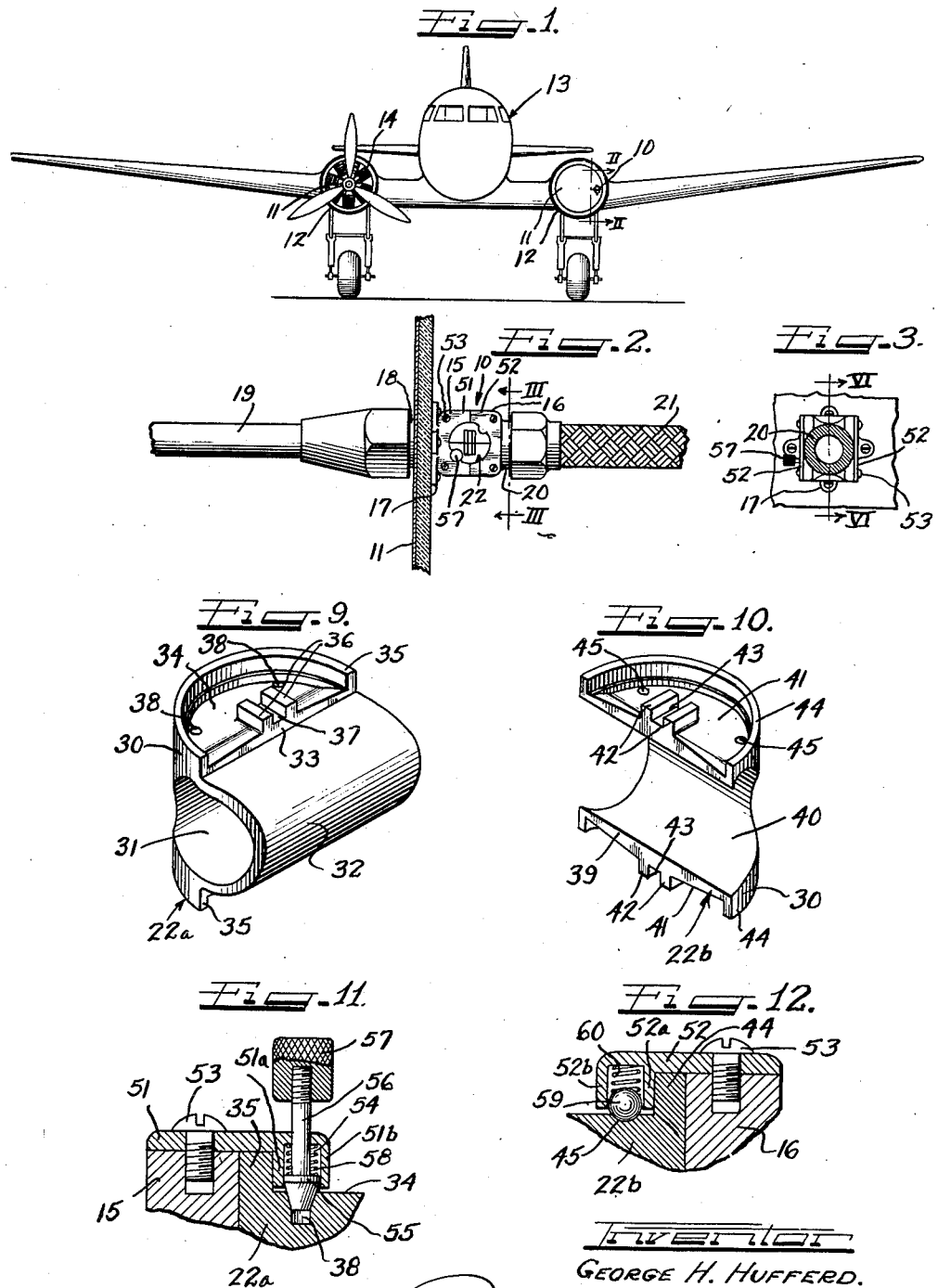
Inventor
GEORGE H. HUFFERD.

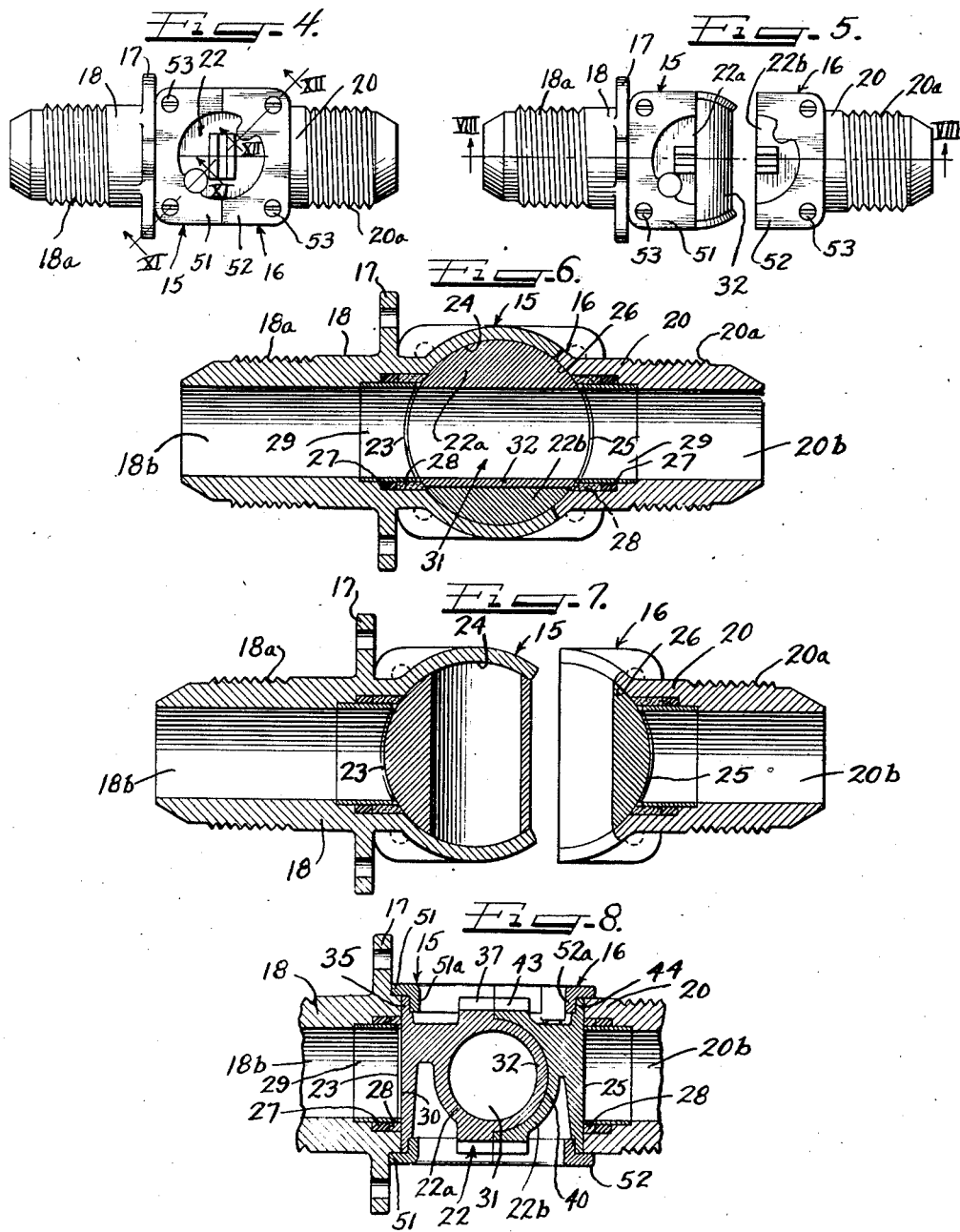

Patented Aug. 10, 1943

2,326,143

UNITED STATES PATENT OFFICE 2,326,143

SELF-SEALING DETACHABLE COUPLING

George H. Hufferd, Detroit, Mich., assignor to Thompson Products Incorporated, Cleveland, Ohio, a corporation of Ohio Application March 31, 1941, Serial No. 386,074

15 Claims. (Cl. 284—4)

This invention relates to self sealing couplings adapted for quick and easy operation while automatically sealing the coupling parts when the same are detached from each other. More particularly, the invention relates to a device for coupling together the ends of tubes, pipes and the like to place the same in unrestricted communication when coupled together and to seal the ends thereof when uncoupled.

While the invention will hereinafter be described in connection with a fuel line to an airplane engine, it should be understood that the couplings of this invention are not limited to such use and that the invention relates to couplings in general.

According to this invention, complementary coupling parts receive the ends of tubes which are to be placed in unrestricted fluid flow communication. A split rotatable cylindrical valve is provided to detachably connect the coupling parts and to control fluid flow between the parts. A portion of the valve is retained in each coupling part for sealing the respective parts when the same are uncoupled to prevent drainage of fluid out of the ends of the then separated tubes.

The valve may take the form of a split cylindrical plug rotatably mounted in a cylindrical chamber formed by a semi-cylindrical recess in each coupling box. The recess of each box has a port communicating with the tube or other passageway to which the box is connected. The plug rotates on an axis normal to the axes of the ports and provides a passageway joining the ports when it is rotated to lock the boxes together. Means are provided for retaining half of the split plug in each coupling box when the same are detached or uncoupled and these halves of the plugs efficiently seal the ports.

It is thus an object of this invention to provide a coupling having a valve for placing the coupling parts in fluid flow communication and for sealing each coupling part when the coupling is broken.

Another object of this invention is to provide a coupling employing a split valve to act as a locking means and as a sealing means for the coupling parts when the coupling is broken.

A further object of this invention is to provide a coupling with a split plug capable of detachably connecting the coupling parts to place the same in unrestricted fluid flow communication and to seal each part when the same are disconnected.

A further object of this invention is to provide a device which will alternately couple and seal the ends of tubes, pipes, hose and the like.

A further object of this invention is to provide a coupling device which automatically joins two passageways in unrestricted fluid flow communication when coupled together and automatically seals the ends of the two passageways when uncoupled.

It will be understood from the following detailed description of the annexed sheets of drawings that the invention has many other objects and uses.

The drawings illustrate a preferred form of the invention by way of example only, since the invention can take many other forms.

On the drawings:

Figure 1 is a front elevational view of an airplane, illustrating a coupling of this invention mounted on the fire wall of an engine nacelle;

Figure 2 is an enlarged cross-sectional view taken along the line II—II of Figure 1 and illustrating the coupling member attached to the fire wall for joining the fuel line from the tank to the fuel line to the carburetor of the engine;

Figure 3 is a cross-sectional view taken substantially along the line III—III of Figure 2;

Figure 4 is a longitudinal side elevational view of the coupling, showing the parts thereof coupled together;

Figure 5 is a longitudinal side elevational view similar to the view shown in Figure 4 but illustrating the parts in uncoupled position;

Figure 6 is an enlarged longitudinal cross-sectional view taken along the line VI—VI of Figure 3;

Figure 7 is a longitudinal cross-sectional view similar to Figure 6 but illustrating the coupling parts in detached position;

Figure 8 is a fragmentary longitudinal cross-sectional view, taken substantially along the line VIII—VIII of Figure 5 but illustrating the parts brought together for rotation of the coupling plug to lock the parts together;

Figure 9 is an isometric view of one portion of the split plug of the coupling;

Figure 10 is an isometric view of the complementary split plug portion for cooperating with the portion of Figure 9;

Figure 11 is an enlarged vertical cross sectional view taken along the line XI—XI of Figure 4; and Figure 12 is an enlarged vertical cross sectional view taken along the line XII—XII of Figure 4.

As shown on the drawings:

In Figure 1 the reference numeral 10 designates generally a coupling member according to this invention, mounted on the fire wall 11 in an engine nacelle 12 of an airplane 13. As indicated, in the other nacelle 12 of the airplane 13 the airplane motors, such as 14, are mounted in front of the fire walls 11.

As shown in Figure 2, the coupling 10 is composed of two coupling boxes 15 and 16. The box 15 has a flange or back wall 17 secured on the front face of the fire wall 11 to rigidly attach the coupling box to the fire wall. The fire wall may be composed of an asbestos sheet, backed by metal, plywood or the like. The coupling box 15 has a hollow shank portion 18 extending through the fire wall 11 and connected to the fuel supply pipe or tube 19 from the airplane fuel tank. The coupling box 16 has a hollow shank portion 20 extending therefrom and secured to the tube or conduit 21 leading to the carburetor of the motor 14. A split plug or valve 22 is mounted in the chamber provided by the coupling boxes 15 and 16 to detachably connect the boxes together for placing the fuel line 19 in full fluid flow communication with the fuel conduit 21. As will be hereinafter more fully explained, a quarter-turn of the valve 22 will serve to disconnect the coupling boxes 15 and 16 and simultaneously seal the ends of the tubes 19 and 21 so that loss of fuel will be prevented. A simple quarter-turn of the valve thus couples and uncouples the coupling boxes and facilitates mounting and dismounting of the motor 14 while at the same time safeguarding against loss of fuel and eliminating a possible fire hazard.

As best shown in Figures 4 to 8, the shank 18 of the coupling box 15 is externally threaded as at 18a and has an internal passage 18b therethrough, terminating in a port 23 which communicates with a segmental cylindrical recess 24 of the coupling box. Likewise, the coupling box 16 has the shank 20 thereof externally threaded as at 20a and has a longitudinal passageway 20b therethrough terminating in a port 25 which communicates with a segmental cylindrical recess 26 in the coupling box 16.

The portions of the coupling boxes 15 and 16 defining the recesses 24 and 26 are adapted to be abutted together as shown in Figure 6 for defining a cylindrical chamber rotatably receiving the split plug 22 therein. The cylindrical chamber has the axis thereof disposed normally to the passageways 18b and 20b and the plug 22 thus intersects the passageways at the ports 23 and 25.

The passageways 18b and 20b are preferably counterbored at their port ends to receive a resilient ring 27 and a ring of packing material 28 urged by the resilient ring 27 against the plug 22. The rings 27 and 28 are held in seated position in their counterbores by means of sleeves or thimbles 29 which are also properly seated in shallower counterbores formed in the passageways 18b and 20b, so that their inner surfaces will lie flush with the walls of the passageways. The resilient ring 27 can be formed of rubber or of synthetic rubber-like material such as "Neoprene," while the sealing ring 28 can be any suitable sealing material, preferably impregnated with a lubricant such as graphite. Graphite impregnated sealing metals can be used, if desired.

As best shown in Figure 8, the plug 22 is composed of a male part 22a and a female part 22b, fitting together to provide a cylinder with an external cylindrical bearing wall 30 riding on the recess defining walls of the coupling boxes 15 and 16 and adapted to receive the seals 28 thereagainst for closing the ports 23 and 25.

As best shown in Figure 9, the plug part 22a has a bore 31 extending transversely therethrough with the ends thereof at the cylindrical wall 30. The bore 31 is partially defined by a semi-cylindrical wall 32 projecting from the inner face 33 of the plug part 22a.

The plug part 22a has flat end walls 34 bounded by upstanding semi-cylindrical flanges 35. Spaced parallel lugs 36 are formed in the central portion of each end wall 34 to define therebetween a keyway 37.

At least one end wall 35 of the plug portion 22a has a pair of wells or dimples 38 therein and spaced 90° apart at points adjacent to the flange 35.

As best shown in Figure 10, the plug part 22b has an inner face 39 adapted to mate with the face 33 of the plug part 22a. A semi-cylindrical recess 40 is provided in the inner face 39 to receive the wall 32 of the plug part 22a. Flat end walls 41 are equipped with upstanding spaced lugs 42 defining keyways 43 adapted to mate with the keyways 37 of the plug part 22a.

Upstanding semi-cylindrical flanges 44 project from the end walls 41 and are adapted to cooperate with the flanges 35 of the plug part 22a to provide continuous cylindrical flanges at the ends of the plug.

Segmental spherical depressions or dimples 45 are formed in an end wall 41 in the same spatial relation as the wells 38 in the end wall 35, for a purpose to be hereinafter described.

The plug parts 22a and 22b are fitted together as shown in Figure 8 by merely seating the wall 32 of the plug 22a into the recess 40 of the plug part 22b.

As shown in Figures 2 to 5 and 8, the coupling boxes 15 and 16 have end caps 51 and 52 secured on the ends of the recess defining portions thereof by means of screws 53. The caps 51 and 52 are centrally apertured and have inturned flanges 51a and 52a spaced inwardly from the recess defining walls of the coupling boxes to provide tracks for the flanges 35 and 44 of the plug parts. The plug part 22a is thus retained in the coupling box 15, while the plug part 22b is retained in the coupling box 16, by these flanges on the caps 51 and 52, respectively. However, the flanges 44 of coupling part 22b are adapted to be moved behind the flanges 51a of the caps secured on the coupling box 15 upon turning these parts to open the port 25 by bringing the bore 31 into registration with the port. Likewise, the flanges 35 on the valve part 22a are adapted to be moved behind the flanges of the caps 52 on the coupling box 16 when the plug is rotated to bring the bore 31 into position for registry with the port 23. As a result, the coupling boxes 15 and 16 will be locked together through engagement of a portion of the flanges on each plug part with both pairs of caps 51 and 52. Thus a turning of the plug 22 when the same has the parts thereof seated together as shown in Figure 8 will automatically result in a locking together of the coupling boxes. At the same time, the plug will be turned to bring the bore 31 therethrough into registration with the ports 23 and 25, to provide unrestricted communication between the passageways 18b and 20b, as shown in Figure 6. It will be noted from Figure 6 that when the coupling boxes are locked together and the plug is in fully opened position, there is a continuous passageway of uniform diameter through the entire coupling device.

As shown in Figure 11, one cap 51 on the coupling box 15 has a projection 51b thereon disposed over the end wall 34 of the valve part 22a which is provided with the wells 38. This portion 51b defines an open bottom and closed top housing 54 slidably receiving a tapered locking pin 55 having a shank portion 56 extending through the top wall of the housing and receiving a knurled knob 57 on the end thereof. The pin 55 is spring urged, by means of a coil spring 58 disposed in the housing 54, for projecting into a well 38, as shown. In this manner the plug part 22a is locked against rotative movement relative to the coupling box 15 whenever the pin 55 is seated in a well 38. Relative movement can be effected only when the knob 57 is pulled to raise the pin out of the well.

As shown in Figure 12, at least one cap 52 on the coupling box 16 has an inwardly projecting portion 51b thereof defining a housing for a ball 59 which is spring-pressed by a spring 60 into a depression 45 on the valve part 22b. The spring-pressed ball serves to prevent movement of the plug part 22b by vibration.

The depressions 38 and 45 in the end walls of the plug parts 22a and 22b are spaced one-quarter of a turn apart so that the pin 55 will snap into a depression 38 only when the plug part 22a is in fully opened or fully closed position and so that the ball 59 will snap into a depression 45 only when the plug part 22b is fully opened or fully closed.

Since the male and female plug parts, when fitted together as shown in Figure 8, must move as a unit, the locking pin 55 will serve to lock the entire plug 22 in position for locking the coupling boxes together and for maintaining the passageway through the coupling boxes fully opened, as shown in Figure 6. As a result, the plug can not rotate by vibration of the airplane engine and the coupling can not be disconnected unless the locking pin 55 is manually retrieved. At the same time, when the coupling parts are disconnected the locking pin 55 will serve to hold the coupling part 22a in position for completely closing the port 23, while the spring-pressed ball 59 will similarly hold the coupling part 22b for completely closing the port 25. As a result, whenever the coupling boxes are disconnected, the plug parts 22a and 22b are automatically locked against unauthorized movement relative to the boxes in order that the ends of the conduits 19 and 21 will be sealed.

From the above description it will be understood that the coupling devices of this invention include two coupling parts, or boxes, and a split rotatable valve adapted for alternatively connecting the coupling boxes in interlocking relation for unrestricted fluid flow communication therebetween and for uncoupling the boxes to seal both uncoupled ends. A simple quarter-turn of the valve or plug automatically couples the parts together or seals the uncoupled parts.

I claim as my invention:

1. A coupling comprising a pair of complementary parts having ports therein for fluid flow therethrough, a multi-piece valve rotatably mounted in both of said parts to detachably connect the same, and means retaining a piece of said valve in each part for sealing the ports when the parts are disconnected.

2. A device for alternately connecting and sealing spaced ends of two conduits, comprising a conduit section adapted to interconnect said conduit ends, said conduit section being split into parts adapted to seal said conduit ends, and said conduit section interlocking said conduit ends whenever said conduit section interconnects said conduit ends.

3. A coupling comprising a pair of complementary coupling boxes, a split plug rotatably mounted in said boxes to detachably connect the same, and means retaining a portion of the plug in each box to seal each box when the plug is rotated for detaching the boxes.

4. A coupling comprising a pair of complementary coupling boxes each having a passageway therethrough terminating in a recess having a wall defining a surface of revolution, and a separate member rotatably mounted in each recess on said wall thereof to close the passageways of the boxes, and said rotatably mounted members cooperating to interlock said boxes together and provide a conduit connecting the passageways of the boxes.

5. A coupling comprising a pair of separable complementary parts each having a complementary recess portion mating together to provide a chamber, and each of said parts having a port communicating with the recess therein, a pair of complementary segments each rotatably mounted in the recess of a part to close the ports in one position thereof and to define a passageway through the chamber to connect the ports in another position thereof, and cooperating engaging means on the parts and segments to automatically couple the parts together when the segments are turned in the chamber for joining the parts and for releasing the parts while retaining a segment in each part when the segments are turned to close the ports.

6. A coupling comprising a pair of parts each having a passageway therethrough and together defining a chamber normal to the passageways and in communication with the passageways, a pair of complementary segments rotatable in said chamber and defining a connecting passageway connecting the passageways of the parts, said segments being movable in the chamber as a unit to alternately position each segment wholly within the chamber portion defined by one part and to position portions of both segments within chamber portions defined by both parts, and means retaining each segment in a part to seal the passageway of said part when the parts are disconnected.

7. A device for alternately connecting conduit ends in fluid flow communication and for sealing said ends in disconnected relation, which comprises a pair of coupling boxes together defining a fluid flow passageway therethrough and an intersecting cylindrical chamber normal to said passageway, a split cylindrical plug rotatably mounted in said chamber and having a bore therethrough adapted to connect the passageways of said parts in one position thereof while sealing said passageways in another position thereof, and means interlocking said parts together whenever said plug is turned to place said passageways in fluid flow communication.

8. A coupling comprising a pair of complementary coupling boxes having passageways therethrough and together defining a cylindrical chamber normal to said passageways in communication therewith, a split cylindrical plug rotatably mounted in said chamber and having a passage therethrough providing a connecting conduit section between the passageways, solid exterior cylindrical walls on said plug adapted for sealing said passageways when the boxes are separated, cylindrical flanges on the ends of the split plug, and means carried by each coupling box receiving said flanges for retaining the plug parts in the boxes whereby a rotation of the plug will move the flanges of one plug part into engagement with the retaining means on the other coupling box for interlocking the coupling boxes.

9. A device for alternately connecting and sealing spaced ends of conduits, which comprises a pair of complementary coupling boxes each having an open segmental cylindrical recess rotatably receiving a segmental cylindrical valve part, said valve part having outturned flanges on the ends thereof, a cap secured on each coupling part having depending segmental cylindrical flanges retaining the flanges of the coupling part, one of said plug parts having a bore therethrough partially defined by a segmental cylindrical wall projecting therefrom, the other of said plug parts having a segmental cylindrical recess receiving said wall, and cooperating means on said plug part for rotating the same as a unit to move the flanges thereof into engagement with the flanges of the adjacent cap for locking the parts together.

10. A coupling device comprising a pair of coupling boxes together defining a longitudinal passageway therethrough intersected by a cylindrical chamber which is partially defined by each part, a split cylindrical plug rotatably mounted in said chamber adapted in one position thereof to connect the passageways and in another position thereof to seal the passageways, each of the plug parts having semi-annular rims at the ends thereof, and semi-annular retaining means carried by each of the coupling parts retaining said rims to hold the plug parts in operative position and to interlock the coupling parts together when the plug is turned to open the passageways.

11. A coupling comprising a pair of hollow complementary coupling boxes each having a longitudinal passageway therethrough and a segmental cylindrical recess communicating with said passageways, a resiliently urged seal seated in each passageway at the point of communication with the recess, and complementary plug parts rotatably mounted in said recesses in sealing engagement with said seals to close the passageways, said plug parts adapted to be fitted together for connecting the coupling parts and for joining the passageways thereof.

12. A coupling adapted for joining the fuel line from an airplane tank to the fuel line to an airplane motor comprising a coupling box having a flange adapted for mounting on the fire wall of an airplane engine nacelle and a hollow shank portion adapted to extend through said fire wall for receiving the fuel line from the tank, a second coupling part having a hollow shank adapted for connection with the fuel line to the airplane engine, and a rotatable split plug carried by said coupling parts having means for interlocking the parts together while placing the hollow shanks thereof in fluid flow communication and adapted for sealing said hollow shanks whenever said parts are disconnected whereby mounting and demounting of the engine from the nacelle is facilitated.

13. A coupling comprising a pair of coupling boxes having hollow shank portions adapted for receiving conduit ends, a split plug having the parts thereof rotatably mounted in said boxes and adapted for alternately connecting the boxes to place the shanks thereof in fluid flow communication and for sealing the shanks, and locking means between each coupling box and each plug part to prevent unauthorized movement of the plug parts.

14. In a coupling device including a pair of coupling parts to be alternately coupled and sealed, the improvement which comprises a connecting and sealing plug composed of two complementary sections each having cylindrical outer walls, inner abutting faces, and end semi-annular rims, said parts when fitted together providing a passageway therethrough normal to the continuous outer cylindrical walls thereof and having continuous annular flanges at the ends thereof.

15. A multi-part coupling having a movable multi-piece valve cooperating in one position to detachably connect the coupling parts and control fluid flow therethrough, said valve pieces being separable in another position to disconnect the coupling parts, and means retaining a piece of said valve in each coupling part to seal the parts when the same are disconnected.

GEORGE H. HUFFERD.